United States Patent
Yu et al.

(10) Patent No.: US 11,521,398 B2
(45) Date of Patent: Dec. 6, 2022

(54) METHOD AND APPARATUS FOR TRAFFIC LIGHT POSITIONING AND MAPPING USING CROWD-SENSED DATA

(71) Applicant: GM GLOBAL TECHNOLOGY OPERATIONS LLC, Detroit, MI (US)

(72) Inventors: Bo Yu, Troy, MI (US); Ashok Yendluri, Southfield, MI (US); Donald K. Grimm, Utica, MI (US); Fan Bai, Ann Arbor, MI (US); Jonathan Wilson, Rochester Hills, MI (US); Quan Zhang, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 16/696,152

(22) Filed: Nov. 26, 2019

(65) Prior Publication Data

US 2021/0158062 A1 May 27, 2021

(51) Int. Cl.
*G06V 20/58* (2022.01)
*G08G 1/01* (2006.01)

(52) U.S. Cl.
CPC ......... *G06V 20/584* (2022.01); *G08G 1/0112* (2013.01)

(58) Field of Classification Search
CPC .................. G06K 9/00825; G08G 1/0112
USPC ............... 382/104; 701/117, 118, 119
See application file for complete search history.

(56) References Cited

U.S. PATENT DOCUMENTS

| | | |
|---|---|---|
| 6,047,234 A | 4/2000 | Cherveny et al. |
| 2003/0125871 A1* | 7/2003 | Cherveny ............ G08G 1/0969 701/409 |
| 2009/0070031 A1* | 3/2009 | Ginsberg ........... G01C 21/3811 701/532 |
| 2012/0288138 A1 | 11/2012 | Zeng |
| 2016/0161265 A1 | 6/2016 | Bagheri |
| 2017/0350713 A1* | 12/2017 | Bhatia .................. G05D 1/0274 |
| 2017/0351266 A1 | 12/2017 | Nickolaou |
| 2018/0072313 A1* | 3/2018 | Stenneth ................. G01S 17/89 |
| 2018/0348762 A1 | 12/2018 | Hilnbrand et al. |

FOREIGN PATENT DOCUMENTS

CN 108305475 A 7/2018

OTHER PUBLICATIONS

Fairfield et al.; "Traffic light mapping and detection"; 2011 IEEE International Conference on Robotics and Automation, Shanghai; May 2011, pp. 5421-5426.
Chinese Office Action Issued in Chinese Application No. 202011335325.7 dated Jun. 6, 2022; 8 Pages.

* cited by examiner

*Primary Examiner* — Omar Casillashernandez
(74) *Attorney, Agent, or Firm* — Cantor Colburn LLP (57) ABSTRACT

A system and method for locating a traffic light at a host vehicle. A probe vehicle obtains image data on an intersection that includes the traffic light when the probe vehicle is at the intersection and identifies the traffic light in the intersection from the data. A remote processor creates an observed node in a digital map corresponding to the traffic light and updates a mapped position of a mapped node within the digital map based on an observed position of the observed node. The host vehicle uses the mapped node of the digital map to locate the traffic light when the host vehicle is at the intersection.

18 Claims, 5 Drawing Sheets

METHOD AND APPARATUS FOR TRAFFIC LIGHT POSITIONING AND MAPPING USING CROWD-SENSED DATA

INTRODUCTION

The subject disclosure relates to determining a location or position of a traffic light using sensors of a vehicle and, in particular, to using crowd-sourced data regarding the location of the traffic light to reduce computational cost at the vehicle for locating the traffic light.

When an autonomous or semi-autonomous vehicle comes to an intersection, it is expected to observe the traffic rules of the intersection, such as stopping when the traffic light is red, slowing down when the traffic light is yellow, etc. In one method of traffic light recognition, the vehicle first obtains an image of the intersection and locates the traffic light within the image using various computational processes. These computational processes can be very time consuming and computationally expensive. At the same time, it is necessary to be able to identify a traffic light and its state in the amount of time it takes for the vehicle to reach the intersection. Accordingly, it is desirable to provide a system that reduces an amount of time and computation at the autonomous vehicle to identify a location of a traffic light and its current state.

SUMMARY

In one exemplary embodiment, a method of locating a traffic light at a host vehicle is disclosed. Image data is obtained on an intersection that includes the traffic light, the image data obtained at a probe vehicle when the probe vehicle is at the intersection. The traffic light is identified in the intersection from the image data. At a remote processor, an observed node is created in a digital map corresponding to the traffic light, and a mapped position of a mapped node is updated within the digital map based on an observed position of the observed node. The traffic light is located at the host vehicle using the mapped node of the digital map when the host vehicle is at the intersection.

In addition to one or more of the features described herein, the method further includes using the mapped node of the digital map to locate the traffic light within image data of the intersection obtained at the host vehicle. The method further includes updating the digital map based on a confidence coefficient associated with the observed node. The method further includes assigning a utility value of the mapped node in the digital map, wherein the utility value increases with a number of observations within a selected time period. The method further includes removing the mapped node from the digital map when the utility value of the mapped node is below a removal threshold. The method further includes determining a location of the autonomous vehicle from an observation of the traffic light at the host vehicle and the mapped position of the mapped node within the digital map. The method further includes adding a new mapped node to the digital map to represent the traffic light when the observed node associated with the traffic light does not pair with the mapped node. The mapped position of the mapped node and the observed position of the observed node are indicated by three-dimensional coordinates within the digital map. The probe vehicle transmits a local position of the traffic light to the remote processor and the remote processor determines the observed position of the observed node from the local position. The probe vehicle further transmits to the remote processor at least one of a traffic light state, a traffic light signal phase and timing, a probe vehicle GPS coordinates, vehicle sensor data, and a detection confidence.

In another exemplary embodiment, a system for locating a traffic light at a host vehicle is disclosed. The system includes at least one probe vehicle and a remote processor. The at least one probe vehicle is configured to obtain image data on an intersection that includes the traffic light when the probe vehicle is at the intersection and to identify the traffic light in the intersection from the image data. The remote processor is configured to create an observed node in a digital map corresponding to the traffic light, and update a mapped position of a mapped node within the digital map based on an observed position of the observed node. The host vehicle uses the mapped node of the digital map to locate the traffic light when the host vehicle is at the intersection.

In addition to one or more of the features described herein, the host vehicle uses the mapped node of the digital map to locate the traffic light within image data of the intersection obtained at the host vehicle. The remote processor is further configured to update the digital map based on a confidence coefficient associated with the observed node. The remote processor is further configured to assign a utility value of the mapped node in the digital map, wherein the utility value increases with a number of observations within a selected time period. The remote processor is further configured to remove the mapped node from the digital map when the utility value of the mapped node is below a removal threshold. The host vehicle is configured to determine its location from an observation of the traffic light at the host vehicle and the mapped position of the mapped node within the digital map. The remote processor is further configured to add a new mapped node to the digital map to represent the traffic light when the observed node associated with the traffic light does not pair with the mapped node. The mapped position of the mapped node and the observed position of the observed node are indicated by three-dimensional coordinates within the digital map. The probe vehicle is further configured to transmit a local position of the traffic light to the remote processor and the remote processor is further configured to determine the observed position of the observed node from the local position. The probe vehicle is further configured to transmit to the remote processor at least one of a traffic light state, a traffic light signal phase and timing, a probe vehicle GPS coordinates, vehicle sensor data, and a detection confidence.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
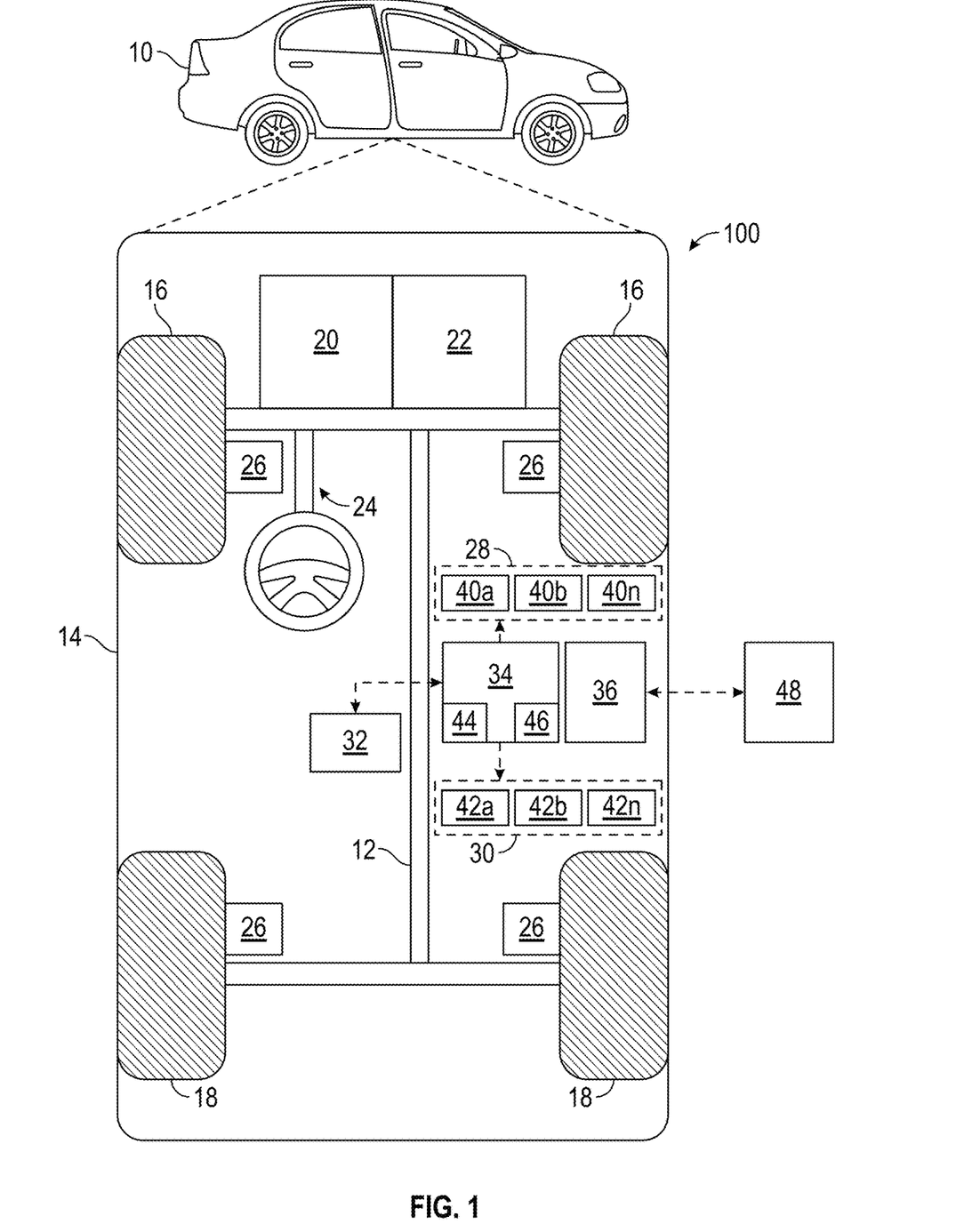
FIG. 1 shows a semi-autonomous or autonomous vehicle in accordance with an exemplary embodiment.

In accordance with an exemplary embodiment, FIG. 1 shows a vehicle 10. In an exemplary embodiment, the vehicle 10 is a semi-autonomous or autonomous vehicle. In various embodiments, the vehicle 10 includes at least one driver assistance system for both steering and acceleration/deceleration using information about the driving environment, such as cruise control and lane-centering. While the driver can be disengaged from physically operating the vehicle 10 by having his or her hands off the steering wheel and foot off the pedal at the same time, the driver must be ready to take control of the vehicle.

In general, a trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near respective corners of the body 14.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, digital cameras, thermal cameras, ultrasonic sensors, digital video recorders and/or other sensors for observing and measuring parameters of the exterior environment. The sensing devices 40a-40n may further include brake sensors, steering angle sensors, wheel speed sensors, etc. for observing and measuring in-vehicle parameters of the vehicle. The cameras can include two or more digital cameras spaced at a selected distance from each other, in which the two or more digital cameras are used to obtain stereoscopic images of the surrounding environment in order to obtain a three-dimensional image. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The at least one controller 34 includes at least one processor 44 and a computer readable storage device or media 46. The at least one processor 44 can be any custom made or commercially available processor, a central processing unit (CPU), a graphics processing unit (GPU), an auxiliary processor among several processors associated with the at least one controller 34, a semiconductor-based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the at least one processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the at least one controller 34 in controlling the vehicle 10.

The instructions may include one or more separate programs, each of which comprises an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller is shown in FIG. 1, embodiments of the vehicle 10 can include any number of controllers that communicate over any suitable communication medium or a combination of communication mediums and that cooperate to process the sensor signals, perform logic, calculations, methods, and/or algorithms, and generate control signals to automatically control features of the vehicle 10.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
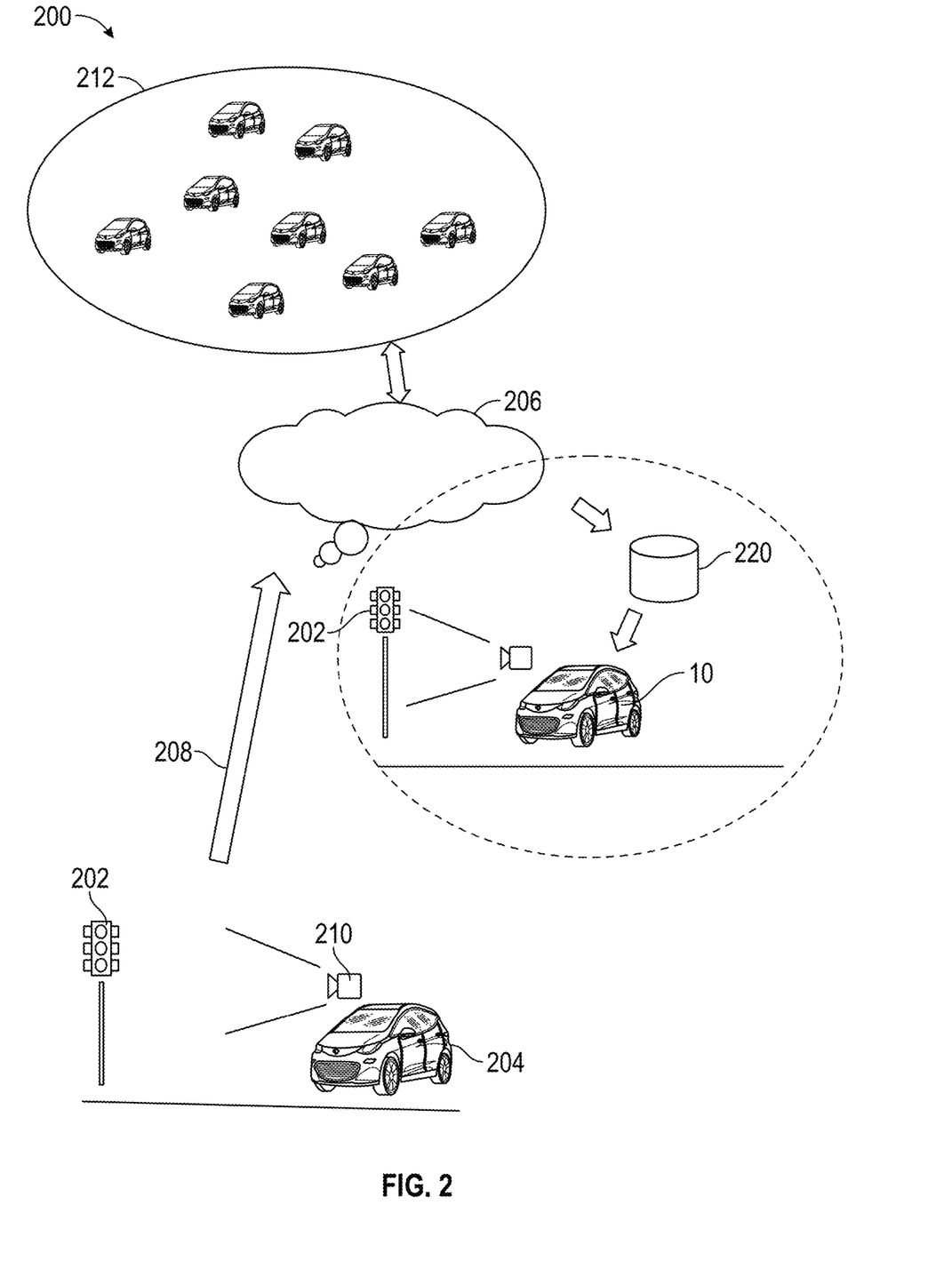
FIG. 2 shows a system for determining a location of a traffic light and for constructing a traffic light location map.

FIG. 2 shows a system 200 for determining a location of a traffic light 202 and for constructing a traffic light location map. The system 200 includes a probe vehicle 204, a remote processor 206 and a communication link 208 between the probe vehicle 204 and the remote processor 206. In various embodiments, the probe vehicle 204 can be an autonomous vehicle as discussed with respect to FIG. 1. The probe vehicle 204 includes at least one image sensor 210, such as a digital camera or digital video recorder. The at least one image sensor 210 is used to capture or collect one or more images of an intersection as the probe vehicle 204 approaches the intersection. The probe vehicle 204 can further include various sensors for determining the position, orientation and/or state of the probe vehicle 204. Such sensors can include a Global Positioning Satellite (GPS) receiver to determine the position of the probe vehicle 204, additional sensors to determine the orientation of the probe vehicle 204, such as the pitch, roll, and yaw of the probe vehicle 204, etc. Velocity sensors can be used to determine a speed of the probe vehicle 204. These sensors can be connected to a processor of the vehicle via a Controller Area Network (CAN).

The remote processor 206 can be a cloud processor or any other suitable processor. The remote processor 206 transmits and receives data from the probe vehicle 204. The remote processor 206 is also in two-way communication with other probe vehicles 212.

As the probe vehicle 204 approaches an intersection, the at least one image sensor 210 captures one or more images of the intersection. The probe vehicle 204 applies various algorithms to the one or more images to identify a traffic light 202 within the one or more images and to determine a local position of the traffic light 202 (i.e., a position of the traffic light 202 within the current reference frame of the probe vehicle 204). In various embodiments, the local position includes three-dimensional coordinates. In general, the traffic light 202 takes up a small amount of space within the one or more images. As a result, the process of identifying the traffic light 202 from within an image from the at least one image sensor 210 is computationally expensive and time-consuming. Once the probe vehicle 204 has identified the local position of the traffic light 202, the local position, as well as other data (i.e., speed of vehicle, GPS coordinates, etc.) is uploaded to the remote processor 206 via communication link 208.

The remote processor 206 stores a digital map 220 including data structures related to each traffic light. A data structure includes a node representing a traffic light as well as positions of the node within the digital map. The reference frame of the digital map 220 can be a standard geocentric reference frame. The digital map 220 includes mapped nodes that are based on data from at least one other probe vehicle and often based on crowd-sourced data from the other probe vehicles 212. When the remote processor 206 receives a local position for the traffic light 202 from a probe vehicle 204, the remote processor 206 inserts a node, referred to herein as an "observed node" into the digital map 220 at an observed position of the observed node. The remote processor 206 further determines coordinates of the observed node from the local position provided from the probe vehicle 212. The observed node can then be matched to or associated with a mapped node based on a proximity between them. The mapped node has a mapped position within the digital map. The mapped position and the observed position are indicated by three-dimensional coordinates within the digital map. The pairing of the observed node to the mapped node is determined by calculating a measure or distance between them (i.e., between the observed position of the observed node and a mapped position of the mapped node). The remote processor 206 runs a position-updating algorithm to update the mapped position of mapped node within the digital map 220 using the observed position of the observed node. The remote processor 206 further operates a map maintenance algorithm to update the confidence of the mapped node and to remove the mapped node from the digital map when it is no longer supported by observations from the probe vehicles.

As shown in FIG. 2, the remote processor 206 can download the digital map 220 or a portion thereof to a host vehicle (i.e., vehicle 10). The vehicle 10 captures one or more images of the intersection and the traffic light 202 using its digital camera or suitable sensor upon approaching the intersection. Using information from the digital map 220 as well as its location and orientation with respect to the intersection, the vehicle 10 is able to determine or approximate the local position of the traffic light 202 within its one or more images in a reduced amount of time as compared with the process performed at the probe vehicle 204 (which is performed without use of the digital map 220). Once the traffic light is located within the one or more images, the host vehicle can determine the state of the traffic light and perform suitable actions in order to obey the traffic regulations indicated by the state of the traffic light.

Figure 3:
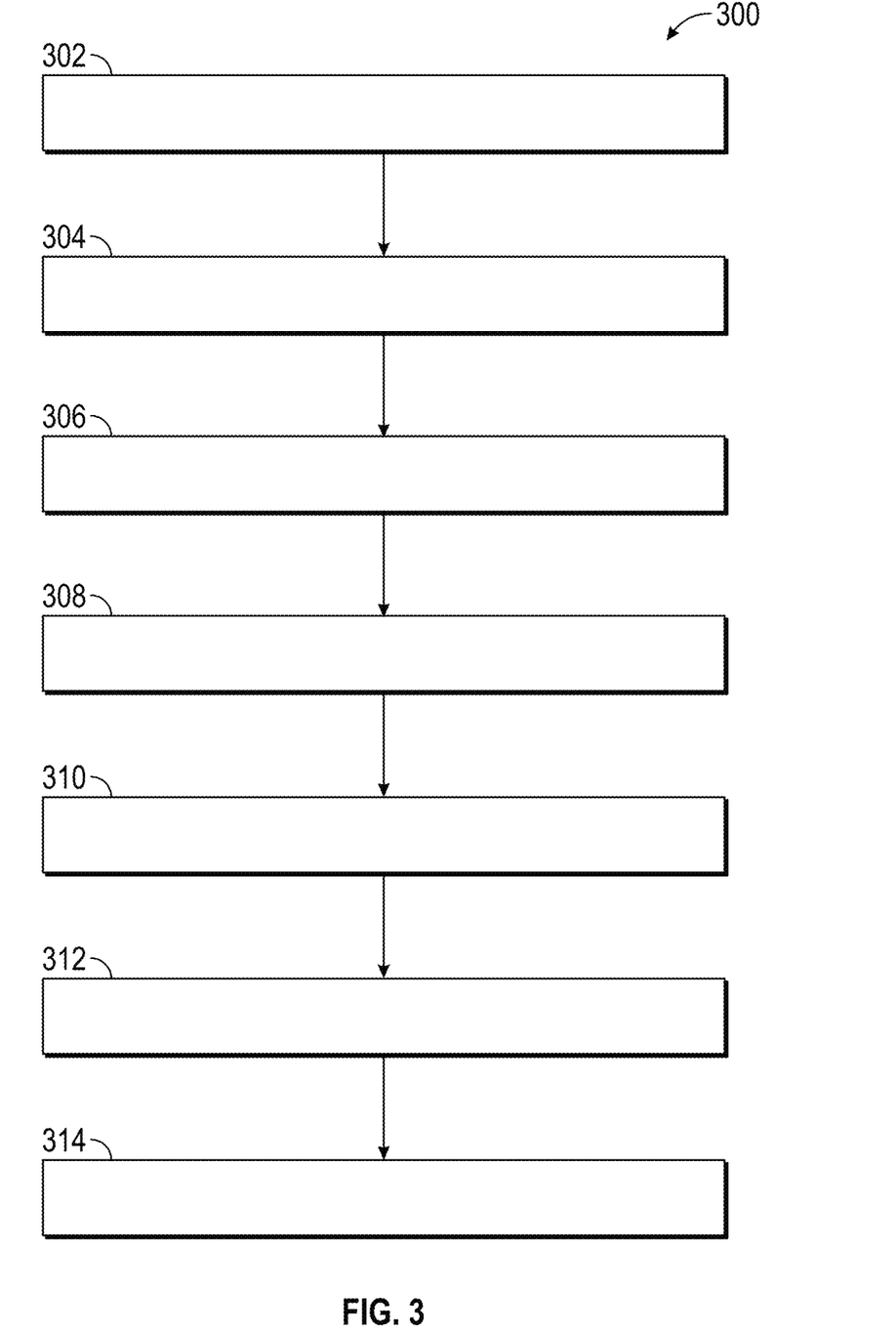
FIG. 3 shows a flowchart illustrating a method performed at a probe vehicle in order to provide a local position of a traffic light to a remote processor.

FIG. 3 shows a flowchart 300 illustrating a method performed at the probe vehicle 204 in order to provide a local position of a traffic light 202 and additional data to the remote processor 206.

In box 302, sensor data is captured at the probe vehicle 204. The sensor data includes one or more images captured by the at least one image sensor 210, such as the digital camera, but also includes various lidar and radar data as well as data concerning the state or position of the probe vehicle. Such state data includes a GPS data, a speed of the vehicle, a pitch of the vehicle, a roll, of the vehicle, and yaw of the vehicle, and any other suitable data useful in determining coordinates of the traffic light.

In box 304, the sensor data is pre-processed at the probe vehicle 204. Pre-processing the sensor data includes performing processes such as synchronizing data and removing noise from data using, for example, data interpolation, curve fitting, and other suitable methods.

In box 306, the traffic light 202 is detected from the sensor data. An object detection process uses sensor fusion algorithms that fuses data from multiple sensors, such as cameras, lidar, radar, etc. in order to detect the traffic light 202. In various embodiments, the traffic light 202 is identified or detected across a plurality of time-frames of the sensor data.

In box 308, the traffic light 202 is tracked across the plurality of time frames of sensor data using one or more object tracking algorithms. Object tracking associates the traffic light detected in a first frame with the traffic light detected in a second or subsequent frame.

In box 310, a local three-dimensional position of the traffic light is determined at the probe vehicle 204. The GPS position of the probe vehicle 204 as well as the output from object detection and object tracking are used to infer the local three-dimensional position of the traffic light. The estimation of local three-dimensional position can use one or more Bayesian estimation algorithms, such as Particle Filters, Kalman Filters, etc.

In box 312, various filters are used to remove false positive detections of traffic lights. False positive detections include objects such as vehicle tail lights, lights on a building, etc. Illustrative filter conditions include, but are not limited to, the following: the height of a traffic light is more than 5 meters above the ground, the position of the traffic light is close to the center of an intersection, etc.

In box 314, the remaining local three-dimensional positions are uploaded to the remote processor 206. The uploaded data can include, for example, traffic light positions (latitude, longitude, altitude), traffic light state, traffic light signal phase and timing, vehicle GPS trace, vehicle sensor data, detection confidence, etc. using a suitable wireless connection, such as Cellular (4G/5G), DSRC V2I, WiFi, etc.

Figure 4:
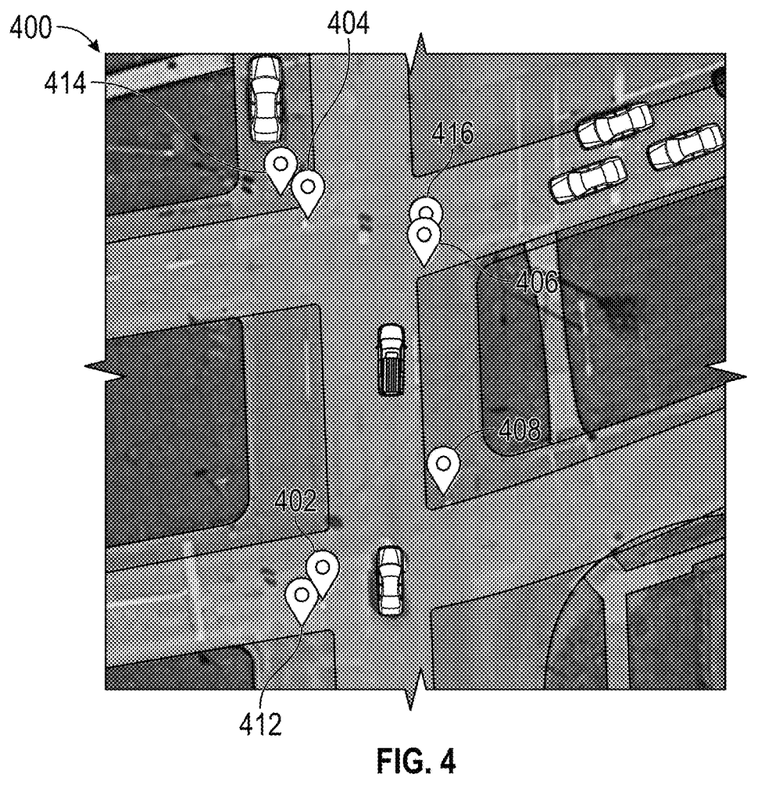
FIG. 4 shows a top view of the digital map.

FIG. 4 shows a top view 400 of the digital map 220 showing various illustrative mapped nodes representing crowd-sourced traffic lights and observed nodes representing observed traffic lights provided by the probe vehicle 204. The mapped nodes 402, 404, 406 and 408 are shown at various intersections of the digital map 220. The observed nodes 412, 414, 416 are shown at their respective locations on the digital map 220. As discussed below, a most likely pair is formed between a mapped node and an observed node based on relative position and/or proximity and then the mapped position of the mapped node is updated within the digital map 220 based on the observed position of the observed node with which it is paired.

Figure 5:
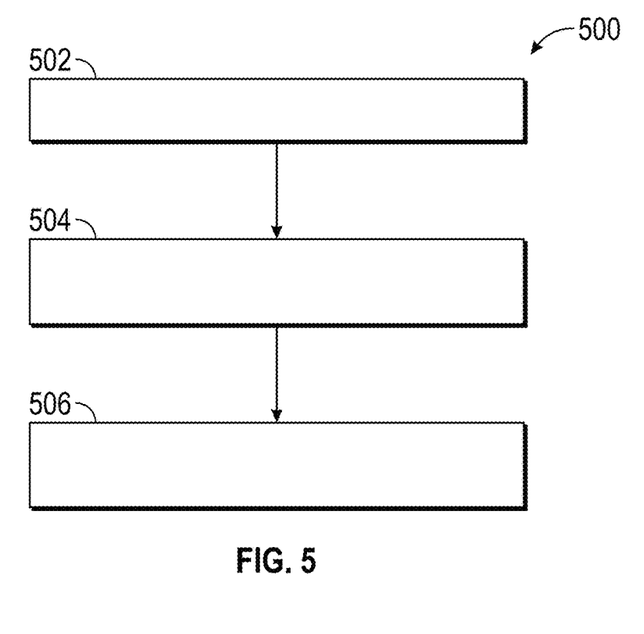
FIG. 5 shows a flowchart of a bi-partite matching process for matching observed nodes to mapped nodes within the digital map of FIG. 4.

FIG. 5 shows a flowchart 500 of a bi-partite matching process for matching observed nodes to mapped nodes within the digital map 220.

In box 502, all possible candidate pairings are determined. A candidate pairing can be determined using a systematic pairing process. One possible candidate pairing has no matches between observed nodes and mapped nodes. This candidate pairing is represented in Eq. (1):

$$\text{No matching } (V_1, V_2, V_3, M_1, M_2, M_3, M_4) \qquad \text{Eq. (1)}$$

where $V_j$ is an observed node associated with a traffic light observed by the probe vehicle 204 and $M_i$ is a mapped node stored in the digital map 220. Another set of candidate pairings includes those in which only one pairing can be found between observed nodes and mapped nodes. Several possible one-match pairings are represented in Eqs. (2) and (3):

$$V_1 \leftrightarrow M_1: (V_2, V_3, M_2, M_3, M_4) \qquad \text{Eq. (2)}$$

$$V_1 \leftrightarrow M_2: (V_2, V_3, M_1, M_3, M_4) \qquad \text{Eq. (3)}$$

In yet another possible candidate paring, two matches can be found between observed nodes and mapped nodes, as shown in Eq. (4):

$$V_1 \leftrightarrow M_1, V_2 \leftrightarrow M_2: (V_3, M_3, M_4) \qquad \text{Eq. (4)}$$

This process is continued until all candidate pairings have been determined.

Figure 6:
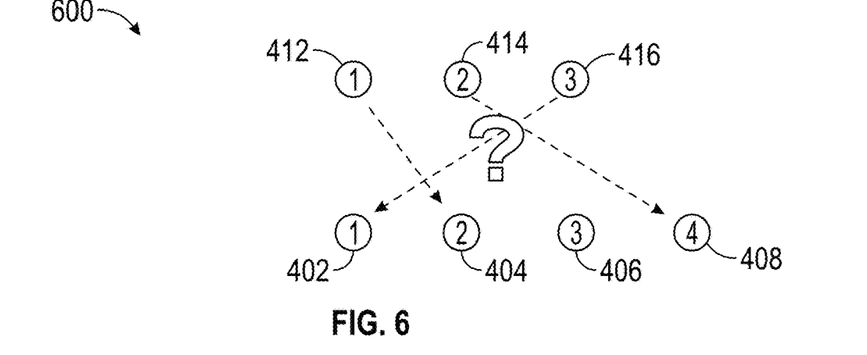
FIG. 6 illustrates a possible candidate pairing for a matching algorithm based on the observed nodes and mapped nodes of FIG. 4.

FIG. 6 illustrates a possible candidate pairing 600 for the matching algorithm of box 502 based on the observed nodes and mapped nodes shown in FIG. 4. As shown in the possible candidate pairing, the first observed node 412 is paired with the second mapped node 404, the second observed node 414 is paired with the fourth mapped node 408 and the third observed node 416 is paired with the first mapped node 402. No observed node appears to be paired with the third mapped node 406.

Returning to FIG. 5, in box 504, a cost function is computed for each candidate pairing, such as shown in Eq. (5):

$$f(m_1, m_2, \ldots, m_n) = \frac{\sum (\text{distance}(m_i))^2}{n^\alpha} \qquad \text{Eq. (5)}$$

where $m_i$ represents a pairing of a mapped node and an observed node and distance ($m_i$) is a distance function between the mapped node and observed node of pair ($m_i$). Parameter n is a number of pairings and a is a scale factor.

In box 506, the candidate pairing having the smallest cost value is returned as a best solution for the pairing of observed traffic lights with mapped traffic lights.

Once an optimal or desired solution has been found in box 506, a confidence coefficient β is calculated for each matching pair of the solution. The confidence coefficient β is an estimate of the confidence of the observed node based on various vehicle parameters during capture of the local position by the probe vehicle 204, such as a distance between the probe vehicle and the traffic light, the model of the probe vehicle 204, a quality of the sensor 210, and a history of prior observations by the probe vehicle. For example, the confidence coefficient can be reduced for a probe vehicle 204 that has a history of returning false positives. With respect to a distance between the probe vehicle and the traffic light, the closer the probe vehicle in general, the more accurate the local position data. However, when the camera is too close to the traffic light (e.g., just below the traffic light), the confidence in the data can be low.

The confidence coefficient β is also based on information at the remote processor 206. A cloud confidence evaluates a confidence of the current state of the digital map.

In box 508, the digital map is updated to include an updated mapped node for the traffic light.

The confidence coefficient β is used to update the mapped positions of the mapped nodes within the digital map 220. One possible updating method is shown in Eq. (6):

$$M_i = (1-\beta) \cdot M_i + \beta \cdot V_i \qquad \text{Eq. (6)}$$

Also, when an observed node is not paired with a mapped node in the digital map 220, a new mapped node can be created within the digital map 220.

The remote processor 206 maintains or tracks a utility value for each mapped node in the digital map 220. When the remote processor 206 receives a new observation from a probe vehicle that pairs with the mapped node, the utility value of the mapped node is increased by a selected utility increment δ. The utility increment δ is a function of several parameters, including the model of the vehicle and the model of the sensor(s) on the vehicle, an observation distance between the probe vehicle and the traffic light, the observation quality of the probe vehicle, and historical data from that vehicle (i.e., does the probe vehicle have a history of detecting false positives?).

Figure 7:
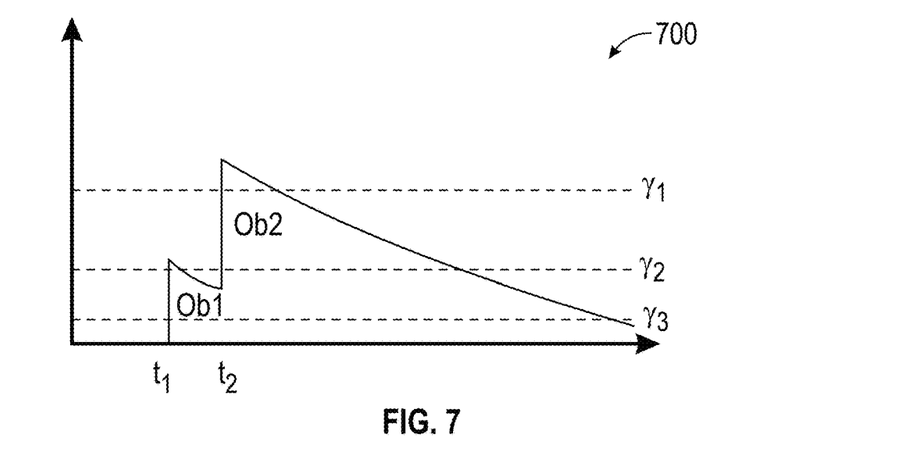
FIG. 7 shows a graph illustrating an evolution of a utility value for an illustrative mapped node.

FIG. 7 shows a graph 700 illustrating an evolution of a utility value for an illustrative mapped node. Time is shown along the x-axis and utility is shown along the y-axis. The utility value increases at time $t_1$ as a first observation is recorded at the remote processor 206 that verifies the mapped node. The utility value increases again at time $t_2$ as a second observation is recorded that confirms the first observation. During time intervals in which there is no observation received at the remote processor 206, the utility value decreases monotonically. Graph 700 shows several thresholds. i.e., a valid threshold $\gamma_1$, an invalid threshold $\gamma_2$ and a removal threshold $\gamma_3$. When the utility value $\delta$ is greater than the valid threshold $\gamma 1$, the mapped node is considered to be valid and can be provided to the host vehicle for subsequent applications. When the utility value falls below the invalid threshold $\gamma_2$, the mapped node is considered to be invalid. When the utility value is less than the removal threshold $\gamma_3$, the mapped node is removed from the digital map altogether.

Figure 8:
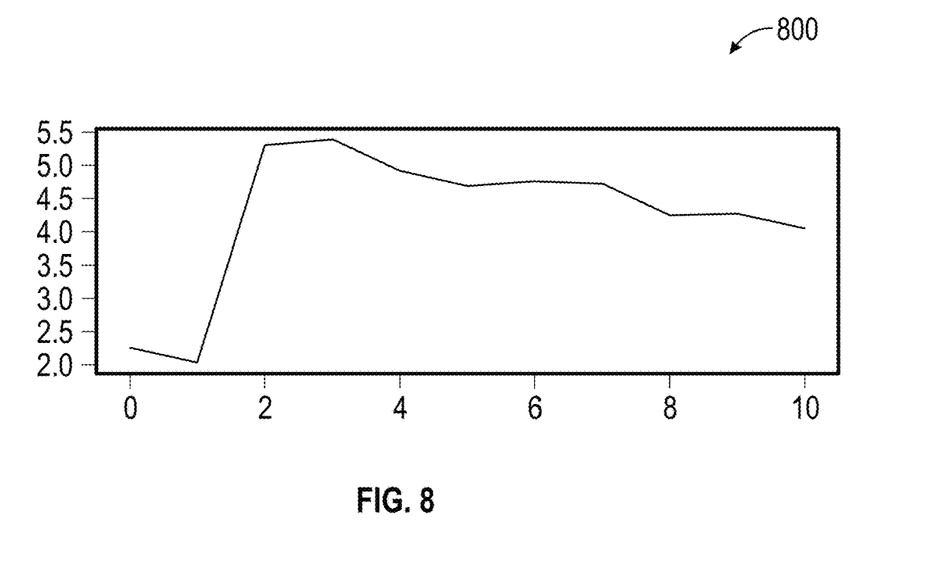
FIG. 8 shows an illustrative graph of an average light position based on a selected number of observations or passes through an intersection.

FIG. 8 shows an illustrative graph 800 of an average light position based on a selected number of observations or passes through the intersection. As the number of observations of the traffic light increases, the average value of the distance of the traffic light above the ground converges to a selected value.

While the methods disclosed herein are discussed with respect to determining a location or position of a traffic light within an image captured at a vehicle in order to reduce computation time in determining the state of the traffic light, the methods can be used with respect to any selected object, particularly with respect to reduce a search time for the object within an image obtained at a vehicle.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of locating a traffic light at a host vehicle, comprising:
    obtaining image data on an intersection that includes the traffic light at a probe vehicle when the probe vehicle is at the intersection;
    identifying a position of the traffic light in the intersection from the image data;
    creating, at a remote processor, an observed node in a digital map corresponding to the traffic light;
    forming, at the remote processor, a matched pair with the observed node and a mapped node in the digital map;
    calculating, at the remote processor, a confidence coefficient for the matched pair based on a history of false positives in prior observations of the probe vehicle during identification of the position of the traffic light;
    updating, at the remote processor, a mapped position of the mapped node within the digital map based on an observed position of the observed node and the confidence coefficient;
    increasing a utility value of the mapped node when the observed node is matched to the mapped node, an increase in the utility value being a function of a model of the probe vehicle, wherein the utility value decreases when no observations are received within a selected time period; and
    locating the traffic light at the host vehicle using the mapped node of the digital map when the host vehicle is at the intersection.

2. The method of claim 1, further comprising using the mapped node of the digital map to locate the traffic light within image data of the intersection obtained at the host vehicle.

3. The method of claim 1, further comprising providing the mapped node to the host vehicle when the utility value is greater than a validity threshold.

4. The method of claim 3, further comprising removing the mapped node from the digital map when the utility value of the mapped node is below a removal threshold.

5. The method of claim 1, further comprising determining a location of the autonomous vehicle from an observation of the traffic light at the host vehicle and the mapped position of the mapped node within the digital map.

6. The method of claim 1, further comprising adding a new mapped node to the digital map to represent the traffic light when the observed node associated with the traffic light does not pair with the mapped node.

7. The method of claim 1, wherein the mapped position of the mapped node and the observed position of the observed node are indicated by three-dimensional coordinates within the digital map.

8. The method of claim 1, wherein the probe vehicle transmits a local position of the traffic light to the remote processor and the remote processor determines the observed position of the observed node from the local position.

9. The method of claim 8, wherein the probe vehicle further transmits to the remote processor at least one of: (i) a traffic light state; (ii) a traffic light signal phase and timing; (iii) a probe vehicle GPS coordinates; and (iii) vehicle sensor data; and (iv) a detection confidence.

10. A system for locating a traffic light at a host vehicle, comprising:
    at least one probe vehicle configured to obtain image data on an intersection that includes the traffic light when the probe vehicle is at the intersection and to identify a position of the traffic light in the intersection from the image data; and
    a remote processor configured to:
        create an observed node in a digital map corresponding to the traffic light;
        form a matched pair with the observed node and a mapped node in the digital map;
        calculate a confidence coefficient for the matched pair based on a history of false positives in prior observations of the probe vehicle during identification of the position of the traffic light;
        update a mapped position of the mapped node within the digital map based on an observed position of the observed node and the confidence coefficient; and
        increase a utility value of the mapped node when the observed node is matched to the mapped node, an increase in the utility value being a function of a function of a model of the probe vehicle, wherein the utility value decreases when no observations are received within a selected time period;
    wherein the host vehicle uses the mapped node of the digital map to locate the traffic light when the host vehicle is at the intersection.

11. The system of claim 10, wherein the host vehicle uses the mapped node of the digital map to locate the traffic light within image data of the intersection obtained at the host vehicle.

12. The system of claim 10, wherein the remote processor is further configured to provide the mapped node to the host vehicle when the utility value is greater than a validity threshold.

13. The system of claim 12, wherein the remote processor is further configured to remove the mapped node from the digital map when the utility value of the mapped node is below a removal threshold.

14. The system of claim 10, wherein the host vehicle is configured to determine its location from an observation of the traffic light at the host vehicle and the mapped position of the mapped node within the digital map.

15. The system of claim 10, wherein the remote processor is further configured to add a new mapped node to the digital map to represent the traffic light when the observed node associated with the traffic light does not pair with the mapped node.

16. The system of claim 10, wherein the mapped position of the mapped node and the observed position of the observed node are indicated by three-dimensional coordinates within the digital map.

17. The system of claim 10, wherein the probe vehicle is further configured to transmit a local position of the traffic light to the remote processor and the remote processor is further configured to determine the observed position of the observed node from the local position.

18. The system of claim 17, wherein the probe vehicle is further configured to transmit to the remote processor at least one of: (i) a traffic light state; (ii) a traffic light signal phase and timing; (iii) a probe vehicle GPS coordinates; and (iii) vehicle sensor data; and (iv) a detection confidence.

* * * * *